United States Patent [19]

Liu et al.

[11] Patent Number: 5,735,134
[45] Date of Patent: Apr. 7, 1998

[54] SET POINT OPTIMIZATION IN VAPOR COMPRESSION CYCLES

[75] Inventors: Sheng Liu, San Fransisco, Calif.; Xiang-Dong He, Arlington, Mass.

[73] Assignee: Massachusetts Institute of Technology, Cambridge, Mass.

[21] Appl. No.: 655,533

[22] Filed: May 30, 1996

[51] Int. Cl.[6] .................................................. F25B 49/02
[52] U.S. Cl. ............................ 62/230; 62/183; 62/205; 62/228.4
[58] Field of Search ..................... 62/230, 229, 228.4, 62/228.5, 180, 203, 204, 208, 209, 181, 183, 184, 205, 206, 210, 211; 236/91 C, 91 R

[56] References Cited

U.S. PATENT DOCUMENTS

| | | | |
|---|---|---|---|
| 4,420,947 | 12/1983 | Yoshino | 62/228.4 X |
| 4,696,167 | 9/1987 | Matsui et al. | 62/180 |
| 4,966,012 | 10/1990 | Iida | 236/91 C X |
| 5,170,935 | 12/1992 | Federspiel et al. | 236/44 C |

OTHER PUBLICATIONS

He et al., "Multivariable Feedback Design for Regulating Vapor Compression Cycles," *Proceedings of the American Control Conference*, pp. 4661–4335 (1995).

He et al., "Modeling of Vapor Compression Cycles for Advanced Controls in HVAC Systems," *Proceedings of the American Control Conference*, pp. 3664–3668 (1995).

Rice, C.K., "Benchmark Performance Analysis of an ECM–Modulated Air–to–Air Heat Pump with a Reciprocating Compressor," *ASHRAE Transactions: Research*, 98(1):430–449 (1992).

*Primary Examiner*—Harry B. Tanner
*Attorney, Agent, or Firm*—Lappin & Kusmer LLP

[57] ABSTRACT

A vapor compression system with set point optimization generates a set of thermodynamic operating parameters such that the system operates with optimum energy efficiency. Based on environmental conditions such as indoor and outdoor temperature as well as thermal load, the set of parameters for steady-state set point is generated. The system also monitors actual system properties in real-time and provides them as feedback to the set point computation module. Based on these actual real-time measurements, a new steady-state set point can be generated to enable the system to continue operating at maximum coefficient of performance upon change in environmental or thermal load requirements.

30 Claims, 13 Drawing Sheets

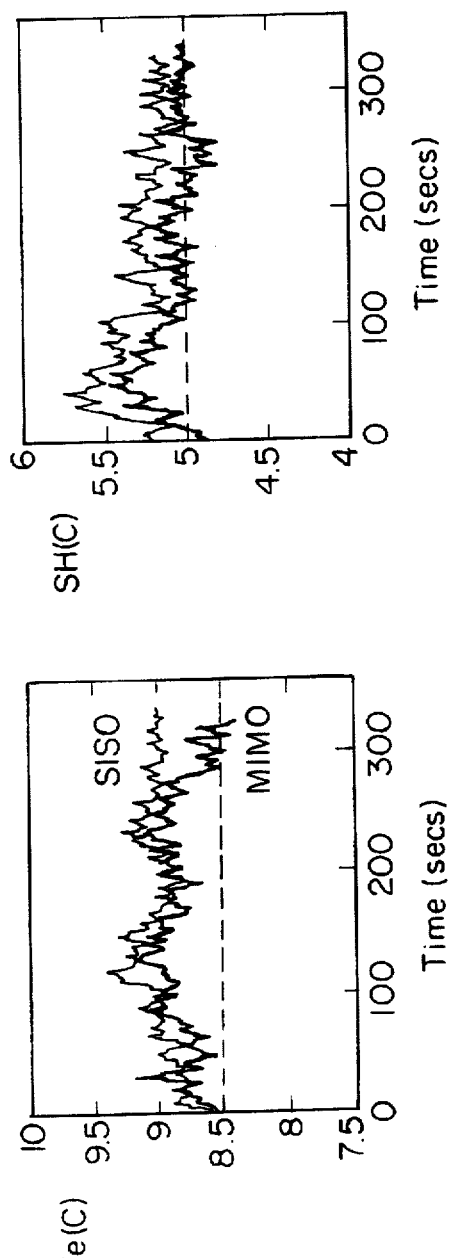
FIG. 16A
FIG. 16B
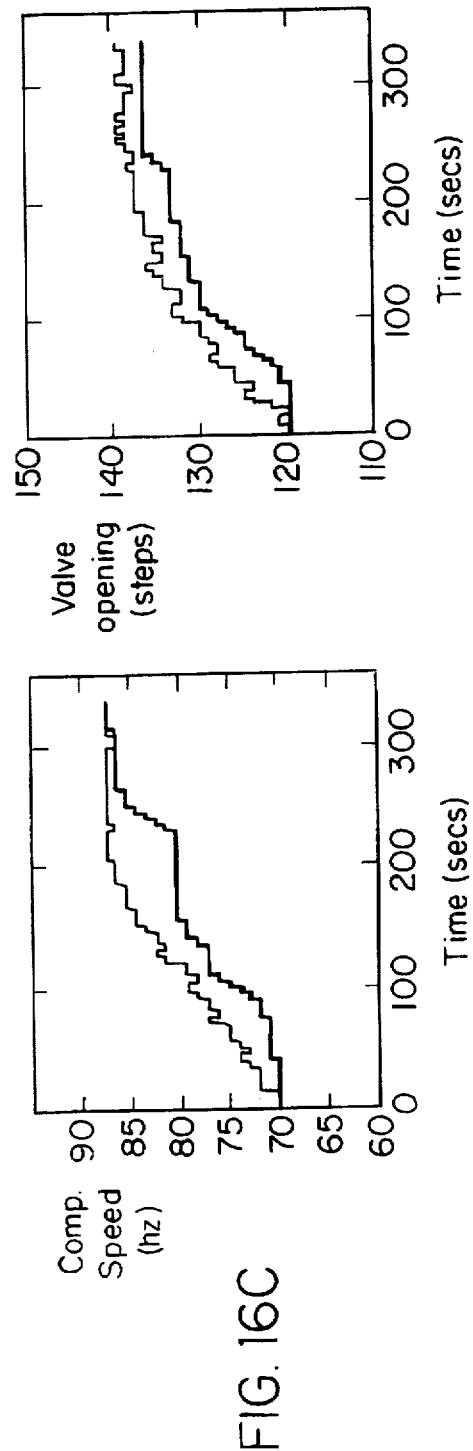
FIG. 16C
FIG. 16D

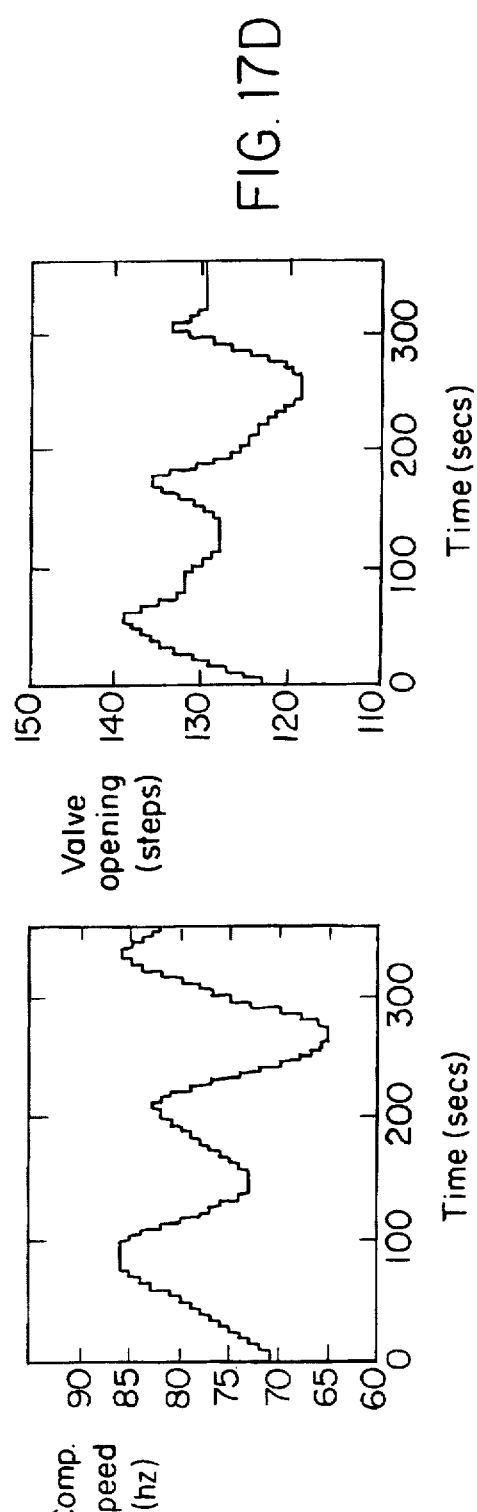
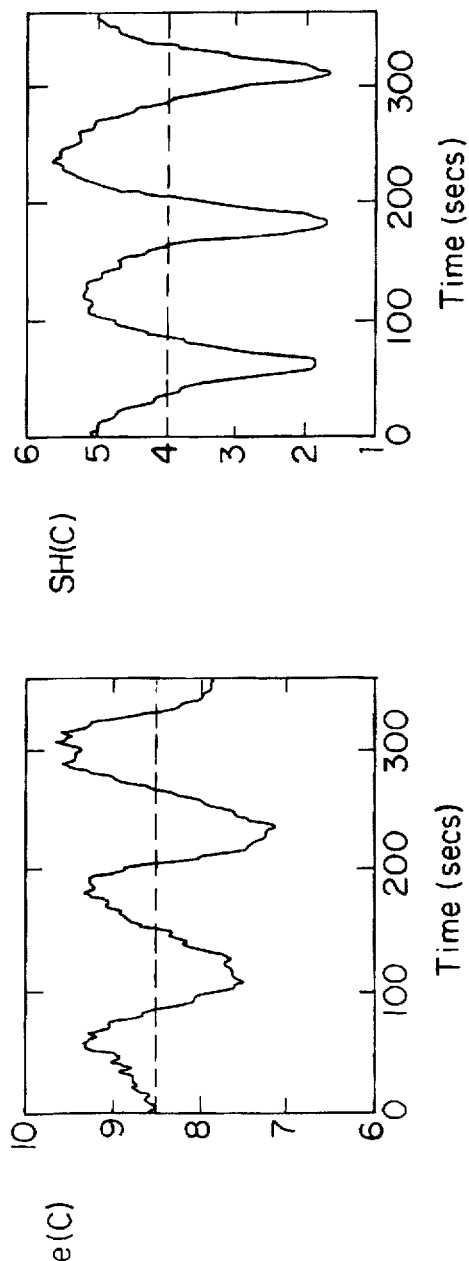
FIG. 17A
FIG. 17B
FIG. 17C
FIG. 17D

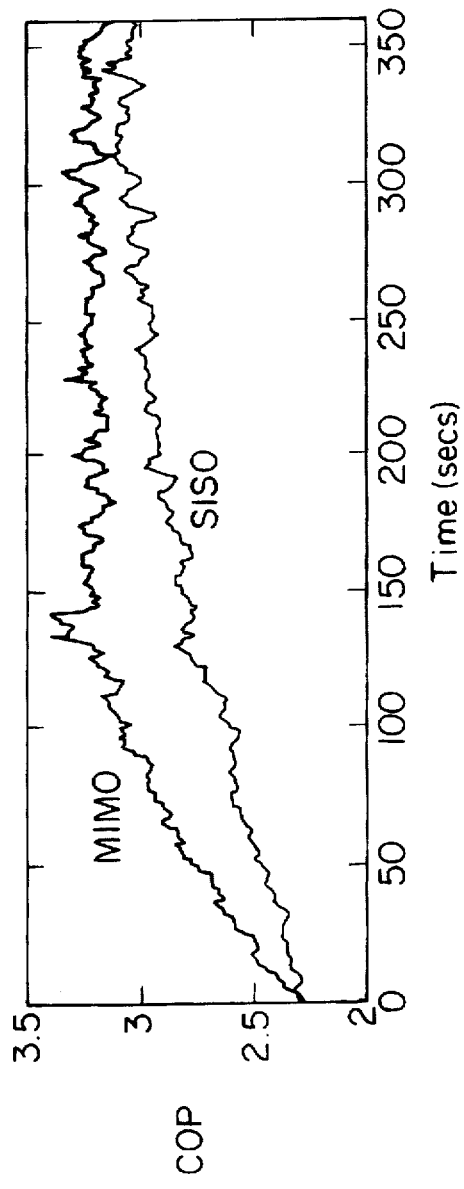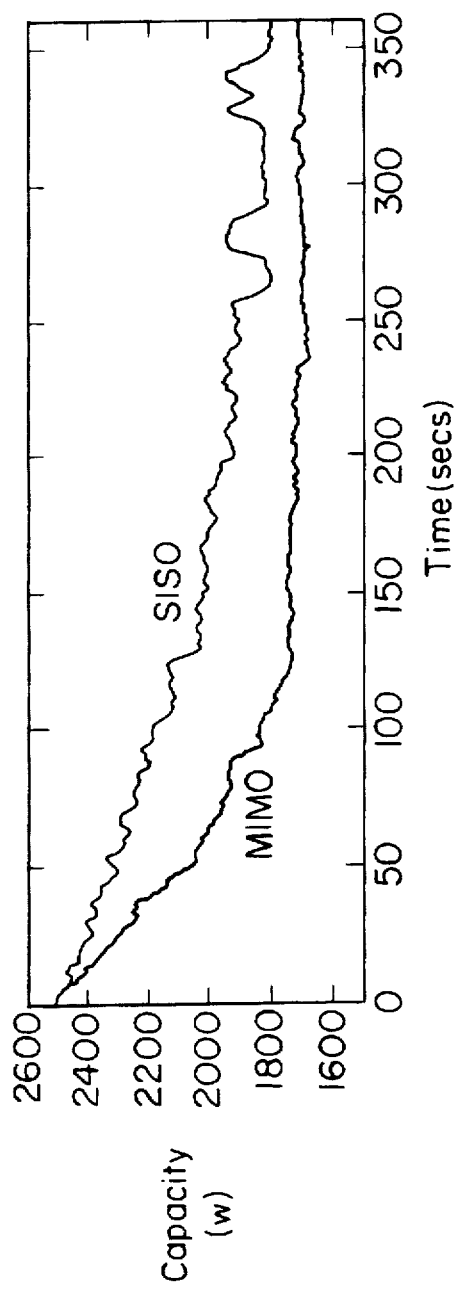

SET POINT OPTIMIZATION IN VAPOR COMPRESSION CYCLES

BACKGROUND OF THE INVENTION

Vapor compression cycles are widely used in industrial and residential applications such as heat pumps and refrigeration and air conditioning systems. Modeling and control of vapor compression cycles to improve the efficiency of such devices have been common research subjects. The introduction of variable speed drives and variable position valves to the vapor compression cycle has greatly improved the flexibility of operation. The compressor speed can be continually adjusted to modulate the refrigerant flow rate. The speed of fans at the evaporator and condenser can be varied to alter the heat transfer coefficient between air and heat exchanger wall. The change in expansion valve opening can directly influence the pressure drop between high side and low side, which, in turn, affects refrigerant flow rate as well as superheat at the evaporator outlet. These flexible components offer opportunities for improving both energy efficiency and machine reliability.

In one typical prior vapor compression system, a system steady-state set point or operating point defined by a system state variable or vector is determined by environmental conditions such as inside and outside temperature and system thermal load. The desired system steady-state point state variable defines certain system thermodynamic parameters including evaporation pressure $P_e$, superheat at the evaporator outlet (SH), condensation pressure $P_c$ and subcool at the condenser outlet (SC). A controller translates the set point parameters into control inputs which control the various components of the system to maintain the parameters at their preset desired lev These control inputs can include compressor speed $\omega_c$, expansion valve opening $a_v$, evaporator fan speed $v_e$ and condenser fan speed $v_c$.

Where substantial changes occur in environmental conditions, such as a drop or increase in indoor or outdoor temperature or change in thermal load requirements, a new steady-state set point is required. In prior systems, the need for a new set point is typically detected manually by an operator monitoring the system. Likewise, determination of the new set point and adjustment of the control input to new appropriate values are accomplished manually. During the time lag involved in resetting to the new set point, the system can suffer substantial inefficiency.

SUMMARY OF THE INVENTION

The present invention is directed to a vapor compression system which provides optimization of the system set point based on real-time on-line system output measurements and thermal load and environmental requirements. In the system of the invention, signals indicative of the system output state variable is fed back to a set point optimization module which updates the system set point as required. By adjusting the set point based on actual system measurements in real time, the system can maintain optimum coefficient of performance (COP) and, therefore, can operate at maximum efficiency.

The set point optimization module includes a model of the vapor compression cycle which is used to generate the set point state variable parameters based on module inputs. These can include environmental and thermal load requirements as well as real-time parameters. Using these variables, the model generates and updates the desired steady-state set point. The set point parameters are selected by the model such that the coefficient of performance is maximized while mass and energy balance and other constraints defined by the model are satisfied.

In one embodiment, the system of the invention also includes a dynamic model used to adjust the system's instantaneous state variables dynamically in response to slight perturbations, as opposed to the set point optimization process described above in which a set point is computed and implemented. This dynamic control includes a controller which generates control inputs to the system components based on fluctuations in the actual set point from the desired set point. In one preferred embodiment, the controller is a multi-input, multi-output (MIMO) multivariable controller. The controller optimally couples the effects of multiple set point parameters and multiple device control inputs to produce optimum adjustment of the set point with very fast response time. In one preferred embodiment of the controller, a gain scheduling function is used to select new controller gain values according to the desired set point.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 16A–16D are plots depicting the disturbance rejection capabilities of SISO control and the MIMO control of the invention upon a change in fan speed.

FIGS. 17A–17D are plots depicting the effect of high-control gains in the MIMO control system of the invention.

FIGS. 19A and 19B are plots showing COP and capacity, respectively, for SISO control and the MIMO control of the invention.

DETAILED DESCRIPTION OF THE INVENTION

Figure 1:
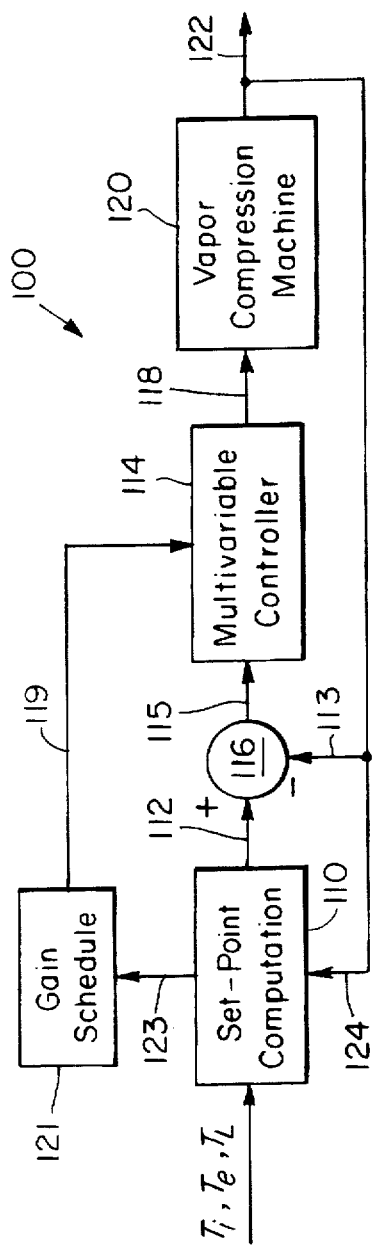
FIG. 1 is a schematic functional block diagram of the vapor compression system of the invention with set point optimization.

In a vapor compression cycle, the evaporator and condenser are the two-phase flow heat exchangers that interact with indoor or outdoor air respectively, depending on its heating or cooling application. During the cycle operation, energy efficiency is closely dependent on the thermodynamic states of refrigerant at various components in the cycle loop. In principle, the cycle loop can be characterized by evaporating temperature or pressure $P_e$, condensing temperature or pressure $P_c$, superheat SH at the evaporator outlet, and subcooling SC at the condenser outlet. A proper regulation of these state variables and their dynamic behavior can lead to energy-efficient operations and can extend the machine's service life. For instance, superheat regulation is extremely important to the compressor operation. The desired superheat is usually set between 5° C. and 10° C. For values below this, there may be the danger of liquid refrigerant entering the compressor. When it is too high, the energy efficiency is low, and the excessively heated vapor may dramatically increase the compressor discharge temperature.

In practice, superheat is often regulated by a thermostatic expansion valve. It is well known that oscillatory behavior or "hunting" often occurs when a thermostatic expansion valve is used. Such oscillatory behavior can be attributed to the dynamics of the closed-loop system consisting of the refrigerant flow and the thermostatic valve.

Over the years, heat pumps and air conditioners have been operated in a cyclic on-off manner for temperature regulation. It is well known that frequent start-up and shut-down transients entailed in the on-off control result in poor energy efficiency. The introduction of variable speed compressors to the vapor-compression cycle has greatly improved its operation flexibility. The compressor speed can be continually adjusted so as to modulate the heat exchanger capacity for matching the actual loading condition. Therefore, the discontinuous on-off operation can be avoided and the energy efficiency can be improved. This is generally known as capacity control.

In addition to variable-speed compressors, adjustable expansion valves and variable-speed fans are also available in heat pumps and air conditioning systems. The opening of an expansion valve can affect refrigerant flow rate as well as pressure drop between the condenser and evaporator, which not only can change the overall coefficient of performance (COP), but also has a direct influence on the superheat at the evaporator outlet. The influence of fan speeds on the two heat exchangers is in the heat transfer coefficient between air and heat exchanger wall. By changing the fan speeds, heat transfer rate can be altered, which results in variations in COP, evaporating pressure $P_e$, condensing pressure $P_c$, superheat SH, as well as subcool SC.

These variable-speed drives offer opportunities for improving both energy efficiency and machine operation reliability. However, before one can take full advantage of these actuating inputs to operate a vapor compression cycle, the role of each actuator in affecting the overall cycle behavior, including at transients and steady states, must be clarified. In particular, how to combine and coordinate these various inputs so as to achieve multiple task goals such as capacity modulation and superheat regulation is a key issue to be addressed. To this end, a sound understanding of the physical behavior of a vapor compression cycle is indispensable. One of the main objectives of the invention is developing and validating an effective model of vapor compression cycle dynamics for the purpose of designing advanced control and diagnostic schemes that are readily applicable to commercial heat pumps and air conditioning systems.

For operation control of vapor compression systems, the major economic return arises from optimization of steady-state operating conditions, i.e., determination of the optimal set-points, rather than from regulation of dynamic, transient behavior. However, optimal set points can be reached and maintained only when the entire cycle is governed by a highly effective dynamic regulator with superior command following and disturbance rejection performance. In particular, with an improved regulation performance, superheat at the outlet of an evaporator can be set at a lower value such that the heat transfer capacity across the evaporator can be increased while complete evaporation of refrigerant before leaving the evaporator can still be guaranteed.

To achieve energy-optimal operation of a vapor compression machine, a control system must be able to automatically compute the optical set-point according to the ambient conditions and thermal requirements, to regulate the machine dynamics to operate as close to this optimal set-point as possible, and to adjust (schedule) the gains in the regulator to guarantee stable feedback control at all time.

1. SET POINT OPTIMIZATION

In addition to variable-speed compressors and adjustable electronic expansion valves, variable-speed indoor and outdoor fans are available in heat pumps and air conditioners. There exist multiple combinations of compressor speed, indoor fan speed, outdoor fan speed, and expansion valve opening that can satisfy cooling (or heating) load condition or thermal comfort requirement. However, the most energy-efficient operation where the COP is maximized corresponds to a certain combination of these control inputs, i.e., the optimal set point. If the optimal set point can be determined and stabilized under arbitrary indoor and outdoor environment, these modern variable-speed drives can be exploited to significantly improve the energy efficiency of vapor compression systems. The multivariable control described above can stabilize an optimal set point or realize fast and stable transitions between changing optimal set points under changing outdoor temperature.

FIG. 1 is a functional block diagram of the vapor compression system of the invention with set point optimization. The system 100 includes a set point computation module 110 which receives environmental inputs including indoor and outdoor temperatures $T_i$ and $T_e$, respectively and the thermal load requirements $T_L$ for the system. The set point computation module 110 uses these inputs to compute a desired steady state set point for the system.

The steady-state set-point is output on line 112 in the form of a state variable or vector $x^S$ which includes values for thermodynamic parameters required to achieve the desired set point. A summing node 116 sums the desired set point vector on line 112 with a feedback signal on line 113 to generate an output error signal on line 115, which is forwarded to a controller 114. The controller 114 is preferably the multivariable controller described below.

The controller 114 produces an output on line 118 which includes control inputs used to drive the various components of the vapor compression machine 120. The output is in the form of a control vector U which includes control signals used to control compressor speed, expansion valve opening, condenser fan speed and evaporator fan speed. These control inputs are received on line 118 by the vapor compression machine 120 to adjust the components of the machine 120 as required.

The vapor compression machine 120 also includes multiple sensors which detect various physical characteristics of the system, such as coolant pressure and temperature. These actual sensed signals are output from the machine on line 122. The signals are fed back to the summing node 116 via line 113 to generate the error signal on line 115 which is used to dynamically update inputs to the controller 114. This feedback loop via line 113 is used to provide dynamic adjustments to the set-point in accordance with the linear model of the vapor compression system 100 as described below.

The output measurements on line 122 are also fed back to the set point computation process via line 124. In accordance with the following description, these fed back real-time on-line measurements are used by the set point computation process 110 to determine a new set point if required to maximize the system coefficient of performance (COP).

This steady-state set-point adjustment is beneficial where substantial changes in system operation caused by such factors as a drop or increase in indoor and/or outdoor temperature or thermal load so change the desired set-point that the system no longer operates in accordance with the linearlized model described below. Under these circumstances, the dynamic adjustment loop comprising the controller 114, the vapor compression machine 120 and line 113 does not allow the machine to operate optimally under these conditions. By readjusting the steady-state desired set-point to a new set-point, and by readjusting the gain values in the controller 114 using gain scheduler 121, via line 119, the dynamic control loop can continue to operate in the linear region of the model around the new set-point, thus resulting in optimal performance with high energy efficiency.

The set-point optimization will now be described in detail. The set-point optimization process includes a model-based, on-line process for identifying the optimal set point at which a vapor compression system can be operated with maximal coefficient of performance (COP). The novel feature of the process is in the use of an analytical model of vapor compression cycles and the sensor measurements taken on-line during cycle operations.

In a vapor compression cycle, the coefficient of performance is defined as the ratio of total thermal capacity to input work:

$$COP = \frac{\text{Thermal capacity}}{\text{Input work}} \quad (1)$$

Figure 2:
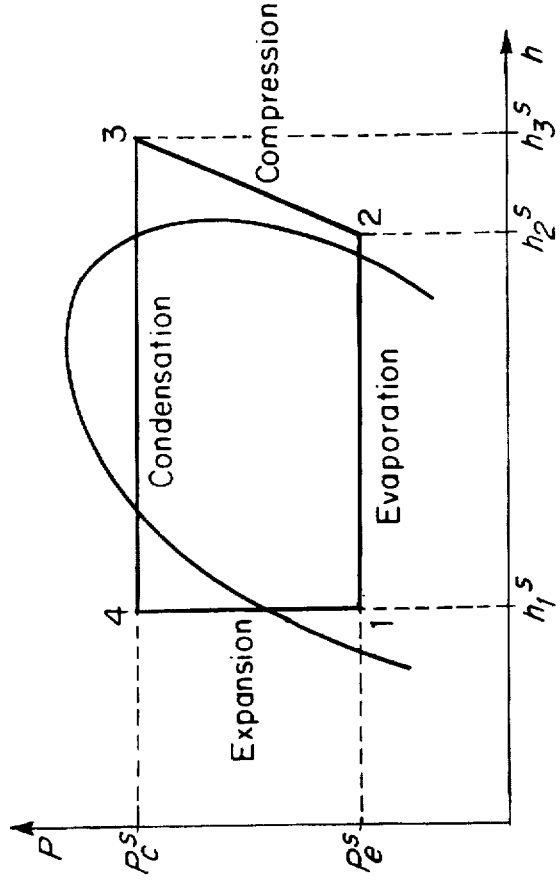
FIG. 2 is a pressure-enthalpy diagram of the vapor compression cycle of FIG. 1.

Essential thermodynamic variables of a vapor compression cycle can be conveniently defined with the aid of a pressure-enthalpy (P-h) diagram as shown in FIG. 2. Essential thermodynamic state variables that uniquely define the operation of a vapor compression cycle include $h_1^s$ (enthalpy at point "1") $h_2^s$ (enthalpy at point "2"), $h_3^s$ (enthalpy at point "3"), $P_e$ (evaporating pressure) and $P_c$ (condensing pressure). Note that the superscript "s" denotes steady-state throughout this description. Note that the segment between points "1" and "2" in FIG. 2 corresponds to the evaporation process. The segment from point "2" to point "3" is the compression process. The segment from point "3" to point "4" is the condensation process. The segment between points "4" and "1" is the expansion process.

Figure 3:
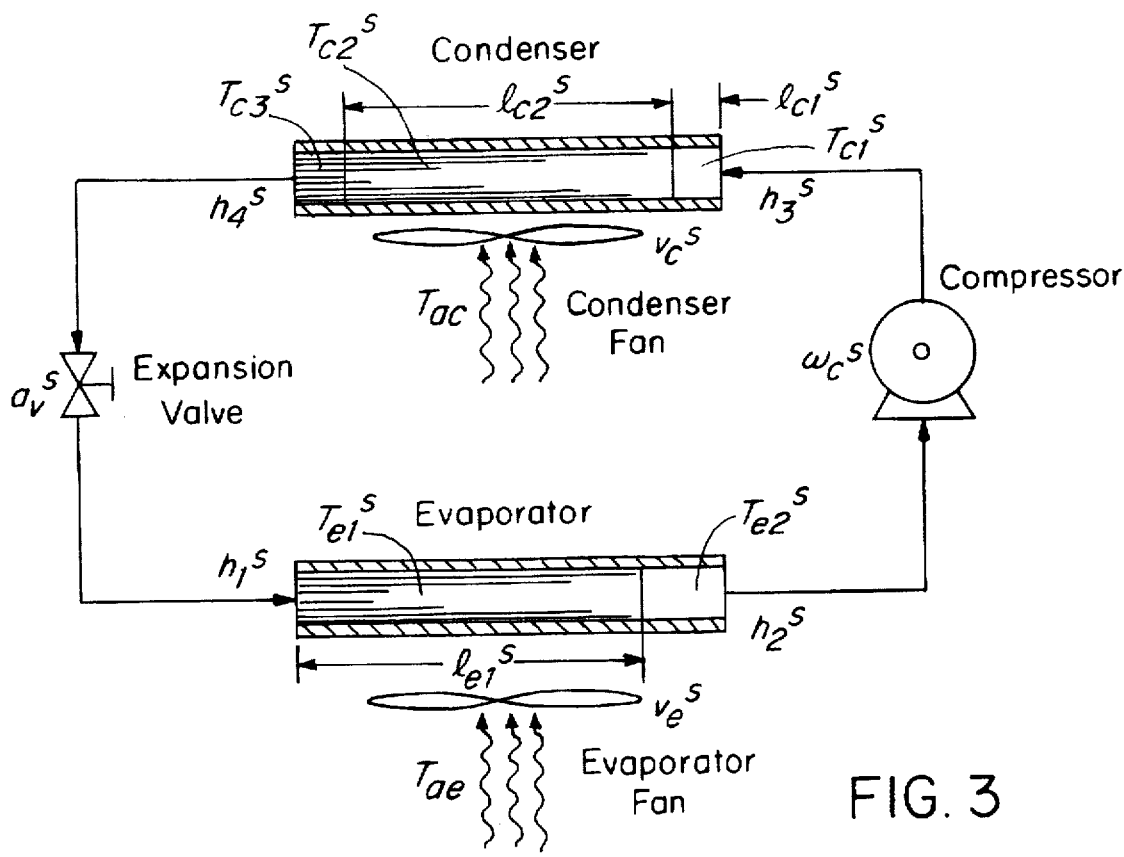
FIG. 3 is a detailed schematic block diagram of the vapor compression cycle of FIG. 1.

In addition to the above thermodynamic state variables defined in the P - h diagram, physical parameters that are related to thermal capacity of the cycle include refrigerant mass flow rate $m^s$, the length of two-phase section in the evaporator $l^s_{e1}$, the length of the superheated section in the condenser $l^s_{c1}$, and the length of the two-phase section in the condenser $l^s_{c2}$. These variables are defined in FIG. 3, which is a detailed schematic of the vapor compression cycle.

In total, there are nine variables defined by the state vector that uniquely determine the thermodynamic state and thermal capacity of the cycle:

$$Z^{sT} = [m^s \; h_a^s \; h_b^s \; h_c^s \; P_e^s \; P_c^s \; l_{e1}^s \; l_{c1}^s \; l_{c2}^s]. \quad (2)$$

The nine variables defined in $Z^S$ satisfy the following mass and energy balance equations (9 equations).

$$m^s(h_{eg}^s - h_1^s) = \alpha_{e1} A_e l_{e1}^s (T_{ae} - T_{e1}^s) \quad (3)$$

$$m^s(h_2^s - h_{eg}^s) = \alpha_{e2} A_e l_{e2}^s (T_{ae} - T_{e2}^s) \quad (4)$$

$$m^s = f(P_c^s, P_e^s, \omega_c^s) \text{ (Compressor map)} \quad (5)$$

$$h_3^s = \frac{h_{IC}(P_e^s, h_b^s, P_c^s) - h_2^s}{\eta_c} + h_2^s \text{ (isentropic compression)} \quad (6)$$

$$m^s(h_3^s - h_{cg}^s) = \alpha_{c1} A_c l_{c1}^s (T_{c1}^s - T_{ac}) \quad (7)$$

$$m^s(h_{cg}^s - h_{cf}^s) = \alpha_{c2} A_c l_{c2}^s (T_{c2}^s - T_{ac}) \quad (8)$$

$$m^s(h_{cf}^s - h_1^s) = \alpha_{c3} A_c l_{c3}^s (T_{c3}^s - T_{ac}) \quad (9)$$

$$m^s = C_v a_v^s \sqrt{\rho_v \Delta P} \text{ (valve equation)} \quad (10)$$

$$M_c = 0 \text{ (Charge inventory balance)} \quad (11)$$

Note that all $\alpha$'s are heat coefficients at various locations in the cycle, $A_e$ and $A_c$ are cross-sectional areas of evaporator and condenser, respectively, $T_{ae}$ and $T_{ac}$ are air temperatures at the evaporator side and condenser side, respectively, $\omega_c^s$ is the compressor speed, and $a_v^s$ is the opening area of the expansion valve.

Altogether, these nine equations can be expressed in a compact, vector-valued form:

$$F(Z^s, u^s, \alpha, \theta) = 0 \quad (12)$$

$$\alpha^T = [\alpha_{e1} \; \alpha_{e1} \; \alpha_{e2} \; \alpha_{c1} \; \alpha_{c2} \; \alpha_{c3}] \quad (13)$$

$$\theta^T = [T_{ae} \; T_{ac}] \quad (14)$$

Vector $u^s$ consists of all input variables that can be used to affect the thermodynamic state and thermal capacity of the cycle.

$$u^s = \begin{bmatrix} \omega_c^s \\ a_v^s \\ v_e^s \\ v_c^s \end{bmatrix} \begin{array}{l} \text{compressor speed} \\ \text{valve opening area} \\ \text{evaporator fan speed} \\ \text{condenser fan speed} \end{array} \quad (15)$$

The set point optimization problem is defined as finding the input vector $u^s$ such that COP can be maximized while satisfying the mass and energy balance constraints (equation (12)) as well as the thermal load constraint.

COP can be expressed analytically as (for cooling mode)

$$COP = \frac{\dot{m}(h_2^s - h_1^s)}{\phi_c(\omega_c^s) + \phi_f(v_e^s, v_c^s)} \tag{16}$$

The numerator in equation (16) is the heat exchange rate at the evaporator. In the denominator, the term $\phi_c(\omega_c^s)$ represents the compressor power consumption rate, and $\phi_f(v_e^s, v_c^s)$ is the power consumption rate of two heat exchanger fans. Functions $\phi_c(\omega_c^s)$ and $\phi_f(v_e^s, v_c^s)$ can be identified empirically or based on further physical reasoning. To simplify the description of the set point optimization process, COP will be expressed in a general function form:

$$COP = COP(Z^s, u^s, \alpha, \theta) \tag{17}$$

To meet the thermal load requirement, denoted $Q_L$, heat transfer rate across the evaporator (for cooling mode) must be made equal to $Q_L$. That is, $$i\ Q_e(Z^s, u^s, \alpha, \theta) = Q_L \tag{18}$$

In mathematical terms, the optimization problem can be described as:

To find $u^s$ such that $COP(Z^s, u^s, \alpha, \theta)$ is maximized.

Subject to constraints:

$F(Z^s, u^s, \alpha, \theta) = 0$ $Q_e(Z^s, u^s, \alpha, \theta) = Q_L$

A constrained gradient descent approach is preferably used for performing the on-line, iterative search for the optimal machine set-point $u^{s*}$. Let $u^s[i]$ denote the machine set point at the $i^{th}$ iteration and $\Delta u^s[i]$ the recommended change in $u^s[i]$. An iteration algorithm should provide $\Delta u^s[i]$ such that the new machine set point $u^s[i+1]=u^s[i]+\Delta u^s[i]$ will result in higher COP. Based on the constrained gradient descent method, $\Delta u^s[i]$ can be computed as $$\Delta u^s[i] = \gamma \left( \nabla COP - \frac{\nabla COP \cdot \nabla Q_e}{\|\nabla Q_e\|^2} \nabla Q_e \right) \tag{19}$$

where $$\nabla COP = \frac{\partial COP}{\partial Z^s} \frac{dZ^s}{du^s} + \frac{\partial COP}{\partial u^s} \text{ evaluated at } Z^s[i], u^s[i] \tag{20}$$

$$\nabla Q_e = \frac{\partial Q_e}{\partial Z^s} \frac{dZ^s}{du^s} + \frac{\partial Q_e}{\partial u^s} \text{ evaluated at } Z^s[i], u^s[i] \tag{21}$$

$$\frac{dZ^s}{du^s} = - \left[ \frac{\partial F}{\partial Z^s} \right]^{-1} \left[ \frac{\partial F}{\partial u^s} \right] \text{ evaluated at } Z^s[i], u^s[i] \tag{22}$$

and $\gamma$ is the learning rate (a small positive number). Note that in order to carry out the computation as shown in equations (19)–(22), values of state variables in vector $Z^s[i]$ are needed. In $Z^s[i]$, $h^s{}_1$, $h^s{}_2$, $h^s{}_3$, $P^s{}_e$, $P^s{}_c$, $l^s{}_{e1}$, $l^s{}_{c1}$, and $l^s{}_{c2}$ can be estimated using low-cost thermocouples. Mass flow rate $\dot{m}$ and all heat transfer coefficients, i.e., all $\alpha$'s, can be computed based on system model $F(Z^s, u^s, \alpha, \theta)=0$. Using equation (19) to compute the correction in $u^s[i]$, the optimization procedure can be carried out iteratively until the optimal set-point $U^{s*}$ is reached.

Figure 4:
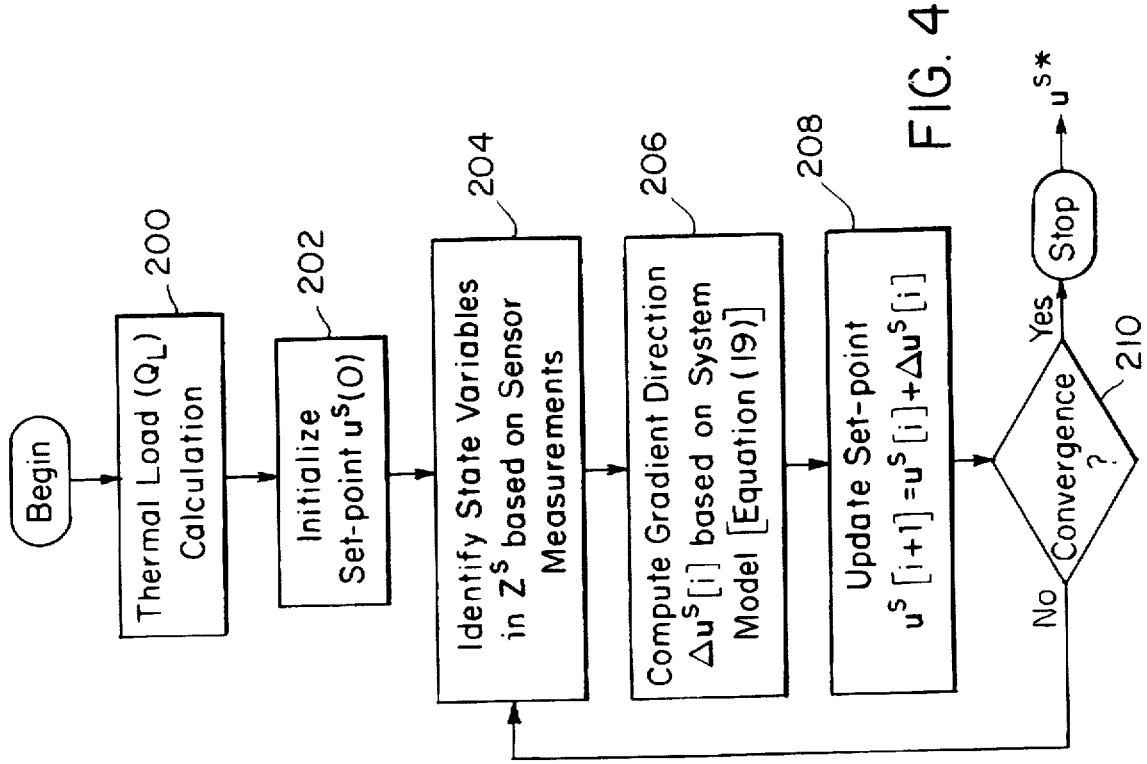
FIG. 4 is a flow diagram illustrating the logical flow of the set point optimization process of the invention.

FIG. 4 contains a flow chart of the on-line set point optimization process. First, in step 200, the thermal load $Q_L$ is calculated or estimated. Then an initial control set point $u^s[0]$ is generated and input to the machine in step 202. Next, in step 204, the state variables in $Z^s$ of the vapor compression system resulting from the set-point input in step 202 are estimated based on sensor measurements. The correction in $u^s[o]$ is made in step 206 based on equation (19). The set-point is updated in step 208 and the new set point is then input to the machine. The updated set-point is checked for convergence in step 210. If no update is made, convergence is achieved, and the process stops. A new control vector $U^{s*}$ is output. If there is not convergence, the same procedure is repeated for seeking the new set-point.

2. DYNAMIC MODELING OF VAPOR COMPRESSOR CYCLES 2.1 A Lumped-Parameter Dynamic Model A new lumped-parameter dynamic model of vapor compression cycles is described in this section. Development of this dynamic model was aimed at deriving a simplified and reliable model for the purpose of multivariable feedback control design. This model is effective in illustrating the fundamental dynamic behavior of a vapor compression cycle in the vicinity of an operating point, and can be readily used for control design.

Dynamics of a vapor compression cycle are mainly comprised of dynamics of two heat exchangers, the expansion valve and the compressor, connecting together with appropriate boundary conditions. The dynamics of the two heat exchangers are dominated by the heat transfer process between refrigerant, heat exchanger tubes, and cross-flow air. The time constant of such process is much greater than that of other dynamic processes in the cycle, such as compression and expansion processes in short transients. Therefore, only heat exchangers are modeled as dynamic components in the overall system. The compressor and the expansion valve are treated as static components. Based on the first principle applied to various components and several assumptions, a set of state equations can be derived to represent a dynamic model for vapor compression cycles.

One challenging problem in building a lumped-parameter model for thermo-fluid or other systems of a distributed nature is that it is unclear how these systems should be reliably lumped to lowest dimension. Observed from the experimental tests, the actual dynamic responses of a vapor compression cycle exhibit the behavior of a very low order system. Therefore, it is possible to simplify the system to a low order dynamic model. In both evaporator and condenser, two-phase refrigerant dominates the major portion of the heat exchangers. The thermal capacitance of these two-phase sections is much greater than that of single-phase sections. Hence, the dynamics of the two heat exchangers are mainly dominated by the dynamic perturbation in the two-phase regions.

Figure 5:
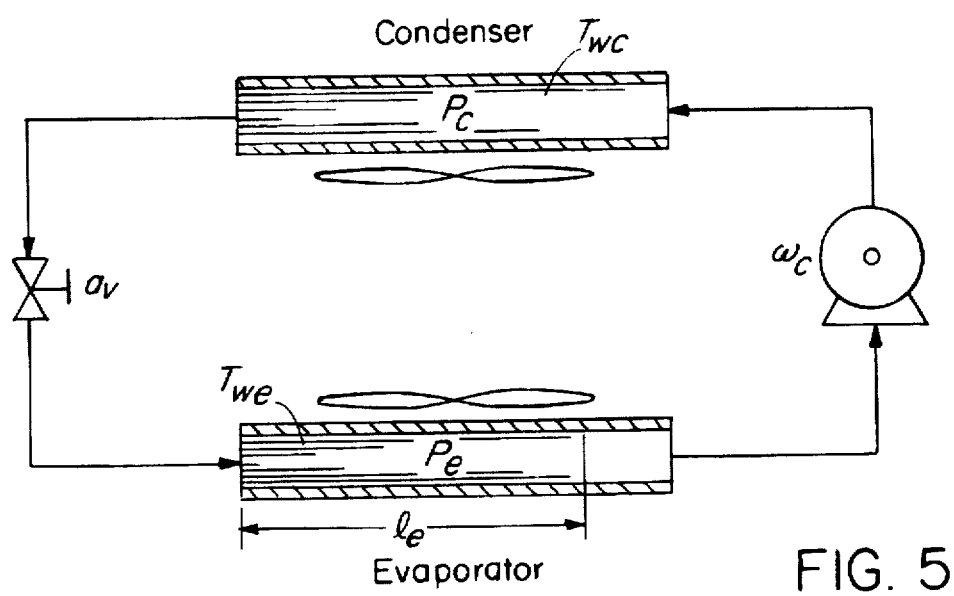
FIG. 5 is a schematic block diagram indicating input variables and state variables relevant to the dynamic behavior of a vapor compression cycle.

To capture the significant dynamics of a vapor compression cycle, a 5th-order lumped-parameter model is used as shown in block diagram form in FIG. 5. Here only five independent state variables associated with the heat exchangers are defined. For the evaporator, it is assumed that the mean void fraction of the two-phase section remains relatively invariant. Evaporating pressure $P_e$ and the length of the two-phase section, $l_e$, are used as state variables to characterize the change in the evaporator's thermodynamic state. For the condenser, it is assumed that the quality of the liquid-vapor mixture in the entire condenser is relatively constant. Therefore, the change in energy stored in the refrigerant in the condenser can be characterized by only the dynamic change of condensing pressure $P_c$. The wall temperature of two heat exchanger tubes, $T_{we}$ and $T_{wc}$, are also considered as independent dynamic variables, due to the considerable thermal capacitance associated with these heat exchanger tubes. For the evaporator, superheat behavior is closely related to the length of the two-phase section.

The governing equations of the model are as follows:

$$\rho_{le} h_{lge} A_e (1-\bar{\gamma}_e) \frac{dl_e}{dt} = \dot{m}_v (h_{ge} - h_{ei}) - \alpha_{ei} \pi D_{ei} l_e (T_{we} - T_{re}) \quad (23)$$

$$A_e L_e \frac{d\rho_{ge}}{dP_e} \frac{dP_e}{dt} = \dot{m}_v (h_{ei} - h_{le})/h_{lge} - \dot{m}_{com} + \quad (24)$$

$$\alpha_{ei} \pi D_{ei} l_e (T_{we} - T_{re})/h_{lge}$$

$$(C_p \rho A)_{we} \frac{dT_{we}}{dt} = \alpha_{ei} \pi D_{ei} (T_{re} - T_{we}) + \alpha_{eo} \pi D_{eo} (T_{ae} - T_{we}) \quad (25)$$

$$A_c L_c \left( (1-\bar{\gamma}_c) \frac{d(\rho_{lc} h_{lc})}{dP_c} + \bar{\gamma}_c \frac{d(\rho_{gc} h_{gc})}{dP_c} \right) \frac{dP_c}{dt} = \quad (26)$$

$$\dot{m}_{com} h_{ci} - \dot{m}_v h_{co} + \alpha_{ci} \pi D_{ci} L_c (T_{we} - T_{re})$$

$$(C_p \rho A)_{wc} \frac{dT_{wc}}{dt} = \alpha_{ci} \pi D_{ci} (T_{rc} - T_{wc}) + \alpha_{co} \pi D_{co} (T_{ac} - T_{wc}) \quad (27)$$

The above five state equations (23)–(27) represent energy balance of refrigerant in the two-phase section of the evaporator, mass balance of refrigerant in the evaporator, energy balance of the tube wall of the evaporator, energy balance of refrigerant in the condenser, and energy balance of the tube wall of the condenser, respectively.

Besides the five state variables $l_e$, $P_e$, $T_{we}$, $P_c$, $T_{wc}$, other variables and parameters in the above state equations are those associated with the evaporator: $\rho_{le}$, density of liquid refrigerant; $\rho_{ge}$, density of vapor refrigerant; $h_{lge}$, enthalpy change from liquid to vapor; $A_e$, inner area of tube; $\bar{\gamma}_e$, main void fraction of two-phase section; $h_{ge}$, enthalpy of saturated vapor; $h_{le}$, enthalpy of saturated liquid; $h_{ei}$, enthalpy at inlet; $\alpha_{ei}$, heat transfer coefficient between tube wall and refrigerant; $\alpha_{oi}$, equivalent heat transfer coefficient between tube wall and air; $D_{ei}$, inner diameter of tube; $D_{eo}$, outer diameter of tube; $T_{re}$, bulk temperature of refrigerant; $L_e$, total length of evaporator; $(C_p \rho A)_{we}$, multiplication of heat capacity, density and cross-section area of the tube wall; $T_{ae}$, temperature of inlet air to evaporator; and those associated with the condenser: $\bar{\gamma}_c$, quality of liquid-vapor mixture in the entire condenser; and $h_{co}$, enthalpy at condenser outlet.

The variable $\dot{m}_v$ is the mass flow rate of the refrigerant through the expansion valve. Liquid refrigerant flowing through an expansion valve can be modeled as the following orifice equation.

$$\dot{m}_v = C_v \alpha_v \sqrt{\rho_v (P_c - P_e)} \quad (28)$$

where $C_{84}$ is the orifice coefficient, $\alpha_v$ is the opening area, $\rho_v$ is the density of the refrigerant. With an electronic expansion valve, valve opening $\alpha_v$ is a continually adjustable variable.

The compressor compresses the low pressure vapor refrigerant into high pressure and generates a mass flow rate $\dot{m}_{com}$. It is assumed that the compressor wall is well insulated from the ambient air. Generally, the mass flow rate in air compressor is dependent on compression ratio, the compressor speed and density of the refrigerant. That is, $$\dot{m}_{com} = f\left(\frac{P_c}{P_e}, \omega_c, \rho\right) \quad (29)$$

where $f$ is given by compressor performance maps, $\omega_c$ is compressor speed $\rho$ is the density of the refrigerant.

The relation between enthalpy at the outlet of compressor $h_{ci}$ (enthalpy at the inlet of the condenser) and the inlet of the compressor $h_{eo}$ (enthalpy at the outlet of the evaporator) is given by $$h_{ci} = \frac{h_{cis}(P_e, P_c, h_{eo}) - h_{eo}}{\eta_c} + h_{eo} \quad (30)$$

where $h_{cis}$ is the enthalpy at the compressor outlet if the compression process is isentropic. $\eta_c$ is the compressor coefficient which is given by a compressor performance map.

Enthalpy at the outlet of the evaporator $h_{eo}$ is dependent on $P_e$, $l_e$, and $T_{we}$. It is assumed that the enthalpy at outlet of the condenser $h_{co}$ is equal to $h_{lc}$.

By combining the five state equations (Equations (23)–(27)). Equation (28) for the expansion valve, and Equations (29) and (36) for the compressor, the following 5th-order dynamic model of a vapor compression cycle is obtained.

$$\dot{X} = g(X, U) \quad (31)$$

where $$X = \{l_e, P_e, T_{we}, P_c, T_{wc}\}^T$$

$$U = \{\omega_c, \alpha_v, v_e, v_c\}^T$$

where $v_e$ and $v_c$ are the indoor fan speed and outdoor fan speed, respectively.

In this dynamic model, the control inputs are compressor speed, expansion valve opening, indoor fan speed, and outdoor fan speed. It is clear that the compressor speed and expansion valve opening directly affect the refrigerant flow rate. The fan speeds affect the air flow rates around the evaporator and condenser, and in turn the air flow rates influence the heat transfer coefficients between air and these subsystems. This nonlinear dynamic model of vapor compression cycle can provide the dynamic responses of several important variables such as evaporating pressure $P_e$ (or temperature $T_e$), superheat SH, condensing pressure $P_c$ (or temperature $T_c$), etc. given any control inputs and ambient conditions.

2.2 Model Linearization

In order to investigate the dynamic behavior of a vapor compression cycle in the vicinity of an operating point and design feedback control to regulate the transient behavior, the dynamic model derived above can be linearized. Using the linearized model, a multivariable control system can be developed to regulate several important variables at arbitrary operating points to maintain desired COP, or provide superior transient control between different optimal set points.

The state space model shown in equation (31) relates control inputs to the responses of all five state variables. This model can be transformed into a linear form by linearizing those nonlinear differential equations around a nominal steady state, for example. $x^s = [l^s_e, P^s_e, T^s_{we}, P^s_c, T^s_{wc}]^T$ while $u^s = [\omega^s_c, \alpha^s_v, v^s_e, v^s_c]^T$. In most cases, a vapor compression cycle is designed to operate only in the vicinity of a predetermined operating point when the ambient conditions remain invariant. The dynamic deviation from this set-point takes place only in a small amount. That is, $$X(t) = x^s + x(t), \quad U(t) = u^s + u(t) \quad (32)$$

where $x(t)$ and $u(t)$ are "small" quantities compared to $x^s$ and $u^s$. The model that describes these dynamic deviations can be obtained as:

$$\dot{x} = Ax + Bu \quad (33)$$

The matrices A and B can be obtained in the linearization process.

The linearized model shown in Equation (33) not only can be used for analysis of the vapor compression cycle dynamics around an operating point, it is also well suited for control design to ensure that the vapor compression cycle dynamics stay within this vicinity. This in fact is a regulator design problem where a dynamic system is to be regulated around an optimal steady state set-point. In the present case, the control objective can be defined as regulating the evaporating temperature, the superheat, etc., in the presence of disturbance due to change in air flow temperatures or outdoor conditions as well as in any other machine components. Advanced control techniques developed for linear systems can be utilized for this regulator design problem.

3. MULTIVARIABLE CONTROL OF VAPOR COMPRESSION CYCLES

3.1 Introduction

Advances in variable-speed drive technology offer tremendous opportunities for improving system performance and energy efficiency in vapor compression systems. The compressor speed can be continually adjusted so as to modulate the heat exchanger capacity to match the actual thermal load. The speeds of fans can be altered to affect the heat transfer rates across the heat exchangers. The opening of the expansion device can be varied, such as a needle valve driven by a stepper motor, so that refrigerant flow rate and pressure drop can be changed. Vapor compression systems equipped with these variable-speed and variable-position drives have already been commissioned for residential and commercial applications for several years. However, to date the industry has not taken full advantage of these variable devices to gain substantial performance improvement.

One of the primary control goals in operating heat pumps and air conditioning systems is to modulate heat exchange capacity to match actual loading condition. Over the years, this has been done by running the compressor in a cyclic on-off manner. It is well known that these frequent start-up and shut-down transients result in poor energy efficiency. With today's variable-speed compressors, the cyclic on-off method has been replaced by a feedback control scheme using indoor temperature as the feedback signal. In addition to capacity modulation, superheat regulation is also essential in maximizing evaporating efficiency and in preventing liquid or excessively heated vapor from entering the compressor. Superheat regulation has been done by merely controlling the expansion valve opening, independent of compressor speed or fan speed controls.

In principle, capacity modulation and superheat regulation have been attempted based on the conventional single-input single-output (SISO) techniques. And the performance has been limited, due to the limitation of the controller structure and the difficulty in tuning the feedback gains in the framework of SISO methodology. In addition, so far only compressor speed and expansion valve opening have been treated as active control inputs for dynamics regulation. Besides compressor speed and valve opening, the speeds of fans at the two heat exchangers are also useful inputs that should be properly controlled for improving system performance.

It can be shown that there are strong cross-couplings between these various actuating inputs and performance outputs such as evaporating temperature, condensing temperature, superheat, etc. By intuition, it is conceivable that a proper coordination among the valve opening, fan speeds, and compressor speed will improve superheat behavior to a greater extent in withstanding external disturbances while the system capacity is effectively modulated. In fact, advanced multi-input multi-output (MIMO) control techniques are readily available to serve this purpose.

This section presents multivariable feedback control design for regulating vapor compression cycles based on the dynamic model developed in the previous section. The control objective is defined as improving the transient behavior of the vapor compression cycle in terms of regulating desired superheat and evaporating temperature. In particular, the conventional control strategy of SISO systems is studied based on the dynamic model and experimental tests. A model-based MIMO control design for controlling desired superheat and evaporating temperature is described. The MIMO control is digitally implemented in a residential air conditioner and compared with the SISO control experimentally.

3.2 Analysis of Traditional Control Scheme in Air Conditioning Systems

Figure 6:
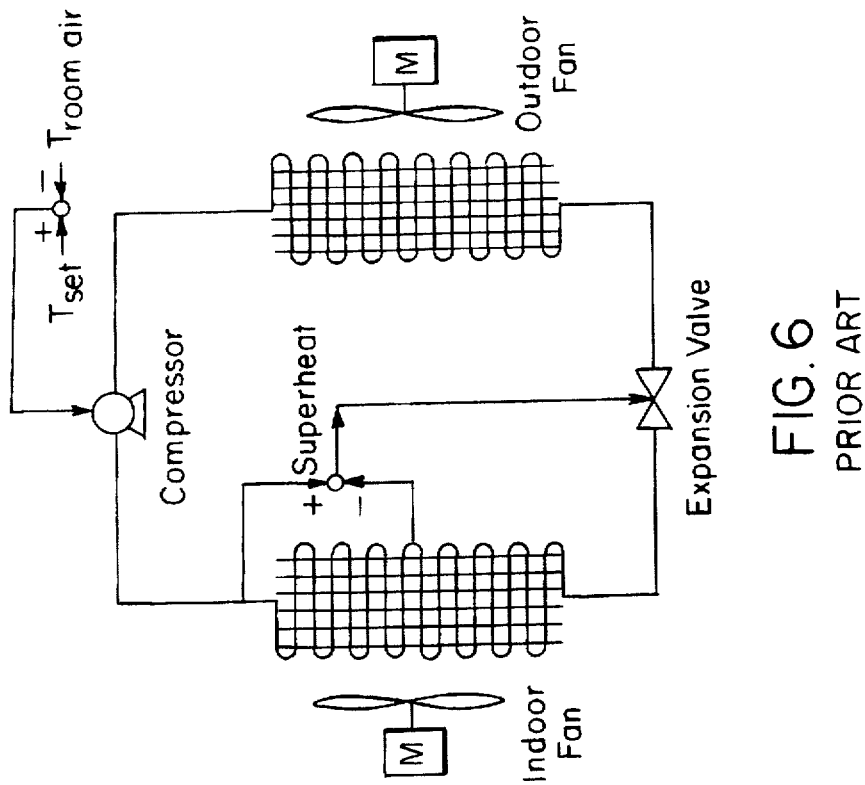
FIG. 6 is a block diagram of a decoupled SISO control system used to control a vapor compression cycle.

To date, the principle of the traditional control method for regulating the vapor compression cycle in an air conditioning system is to control indoor room temperature (or evaporating temperature $T_e$ or cooling capacity) by the compressor speed and to regulate superheat SH by the expansion valve opening as shown in FIG. 6. There is no feedback control for fan speeds. The indoor fan speed is set to be proportional to the compressor speed and the outdoor fan is kept to have constant speed.

The two control loops are treated as two independent SISO systems, which results in a diagonal control structure (decentralized control) while the cross-couplings in the plant dynamics are completely ignored. Often a proportional-integral (PI) controller is used in the valve-superheat loop to regulate SH within a desired range, while the indoor room temperature is controlled by a proportional scheme acting on the compressor speed to match the indoor thermal load during a cooling mode. For a system with cross-coupling reflected by the non-zero off diagonal terms in the transfer function matrix, such an independent SISO control invariably will result in drawbacks in its performance.

It has been observed that superheat controlled by the thermostatic expansion valve can exhibit undesirable oscillating behavior, known as the hunting phenomena. This can be clearly explained by the model we describe herein. In the transfer function from the expansion valve to superheat based on the model, there exists a nonminimum phase zero which stays in the right hand side of the s-plane.

Figure 7:
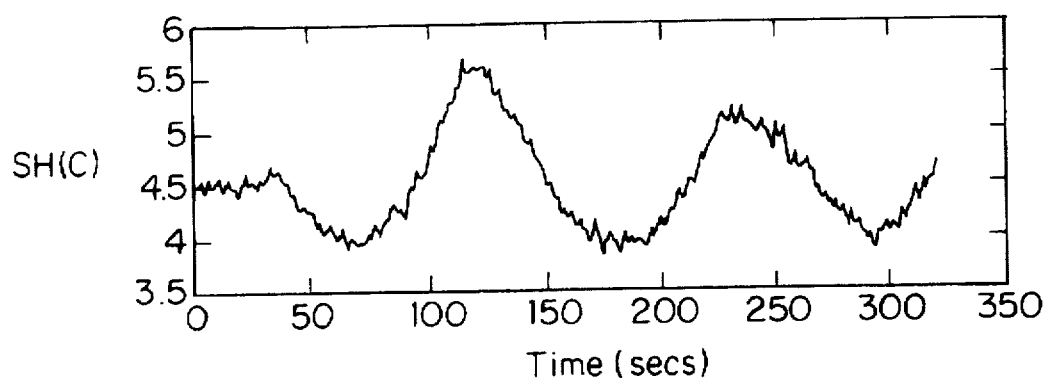
FIG. 7 is a plot showing the response of valve-controlled superheat to a step change in compressor speed.

A proportional-integral-derivative (PID) controller has been proposed to regulate the superheat using a motor drive needle expansion valve to avoid steady state error. However there is strong coupling between superheat and compressor speed. FIG. 7 shows the response of valve-controlled SH (PI controller) to a step change in compressor speed. It can be seen that the transient process takes a long time to reach the desired steady state. There is no way to adjust PID controller parameter to get a quick response without causing oscillation or large undershoot.

Figure 8:
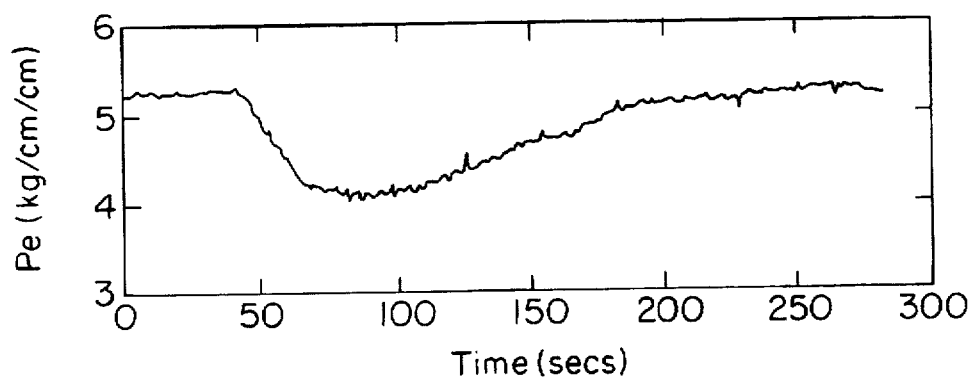
FIG. 8 is a plot showing response of compressor-controlled evaporation pressure to a step change in expansion valve opening.

FIG. 8 shows the response of compressor-controlled $P_e$ (PI-controller) to a step change in valve opening. It can be seen that the transient process is long and has undesired undershoot. As shown in FIGS. 7 and 8, a poor coordination between compressor speed and valve opening in the presence of strong cross-couplings can result in unfavorable interference between the two loops.

Figure 9:
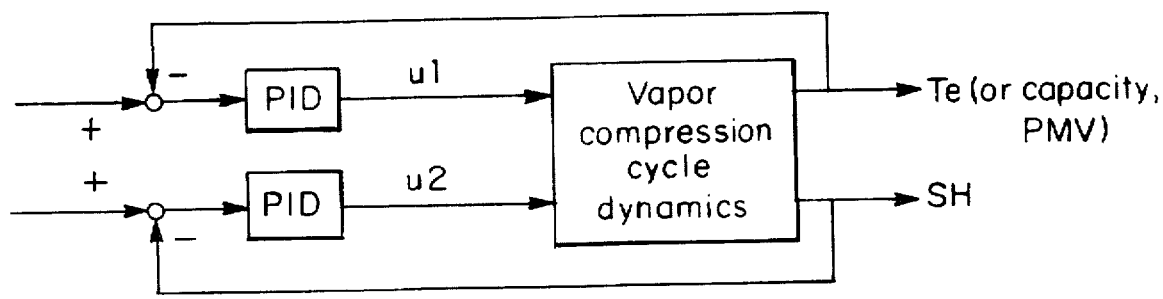
FIG. 9 is a schematic block diagram of a decoupled SISO control system used to control evaporating temperature and superheat in a vapor compression cycle.
Figure 10A:
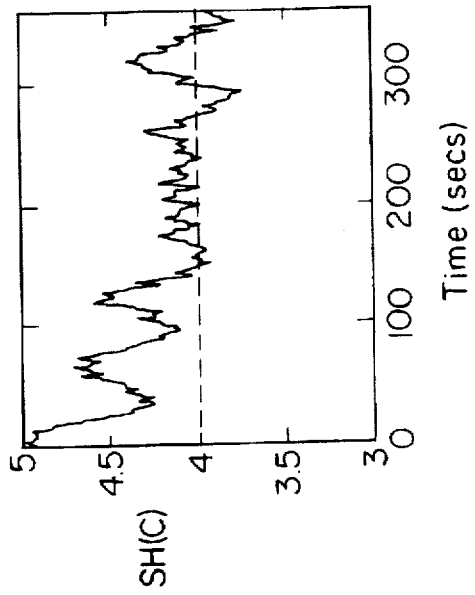
FIGS. 10A–10D depict the performance of a SISO control system with gains tuned based on Zigler-Nicoles optimal gain tuning method.
Figure 10B:
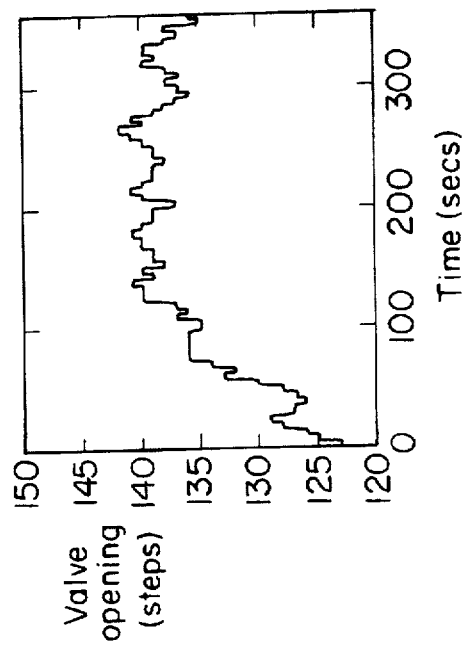
Figure 10C:
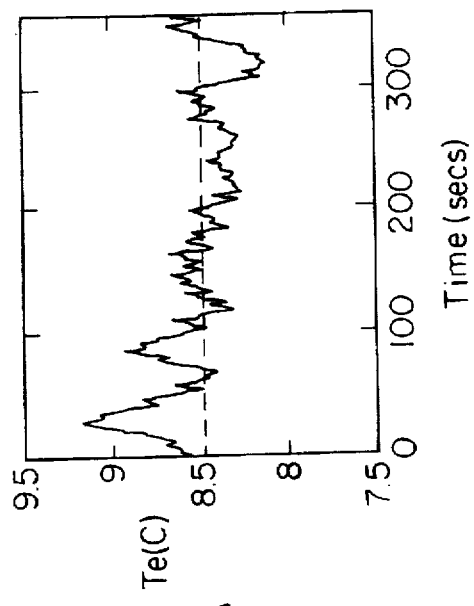
Figure 10D:
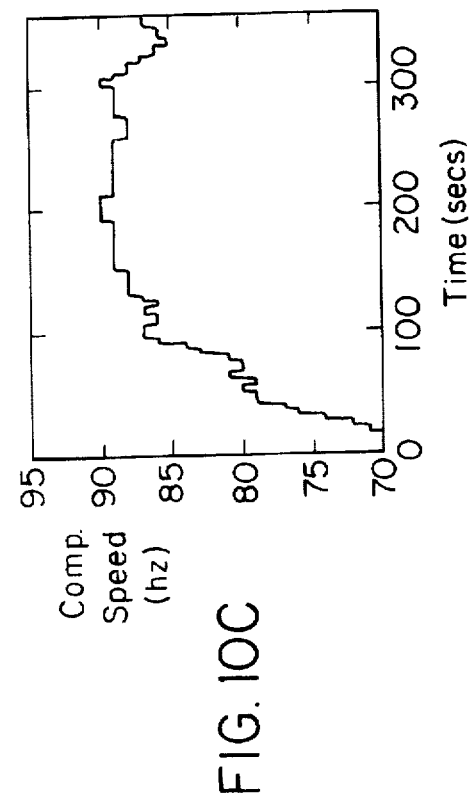

The conventional control system for regulating the vaporating temperature $T_e$ and the superheat SH is illustrated in FIG. 9. Two control loops are decoupled. Since there exists strong cross-coupling between these two control loops, the performance of the conventional SISO system is very limited.

FIGS. 10A–10D show the performance of the SISO control system if the gains are tuned based on Zigler-Nicoles optimal gain tuning method for PI controller. In FIGS. 10A to 10D, the control objective is to reduce the desired superheat value from 5° C. to 4° C. while evaporating temperature is kept at 8.5° C. It is observed that the control system is oscillating. To avoid unstable or oscillating performance, small gains must be used. That generally causes slow transient processes.

Figure 11:
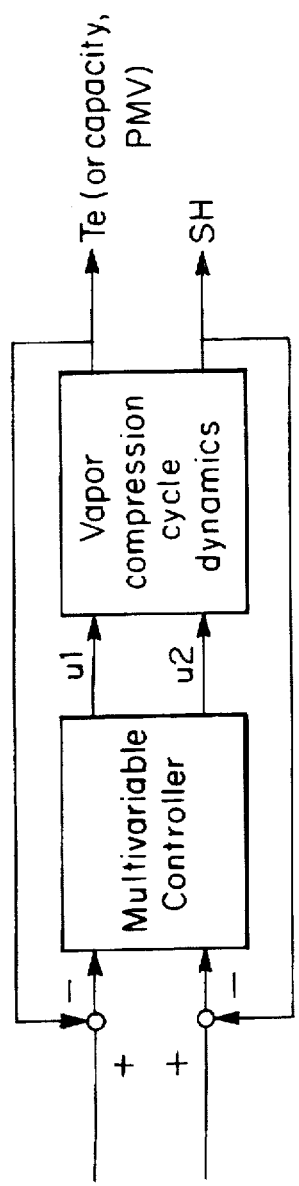
FIG. 11 is a schematic block diagram of a MIMO control system in accordance with the invention.

3.3 Model-Based MIMO Control of Vapor Compression Cycles 3.3.1 A Multivariable Control Design Method: LQG with Integrator In order to better control the transient processes of vapor compression cycles, model-based multivariable control is described. Based on the dynamic model of a vapor compression cycle developed in the previous section, multivariable control systems can be designed to control $T_e$ (or $P_e$) and SH by both compressor speed and expansion valve opening. FIG. 11 shows the schematic diagram of a MIMO control system in accordance with the invention. It will be noted that the MIMO control of FIG. 11 uses both feedback signals to generate two control inputs, unlike the decoupled SISO control which uses one feedback signal to generate each signal control input. When a dynamic model is used to design a MIMO control, the cross coupling between the two single SISO loops can be taken into account. That makes the MIMO control have better performance than the decoupled SISO control, since the two SISO loops are strongly coupled.

Based on the dynamic model, we designed multivariable controllers to control the vapor compression cycle. The particular objective of control here is to regulate superheat and evaporating temperature by both compressor speed and expansion valve opening. The multivariable control method which is used here is Linear-Quadratic Gaussian (LQG) control with integrator because this MIMO control can optimize a cost function which compromises the output errors and control efforts.

Figure 12:
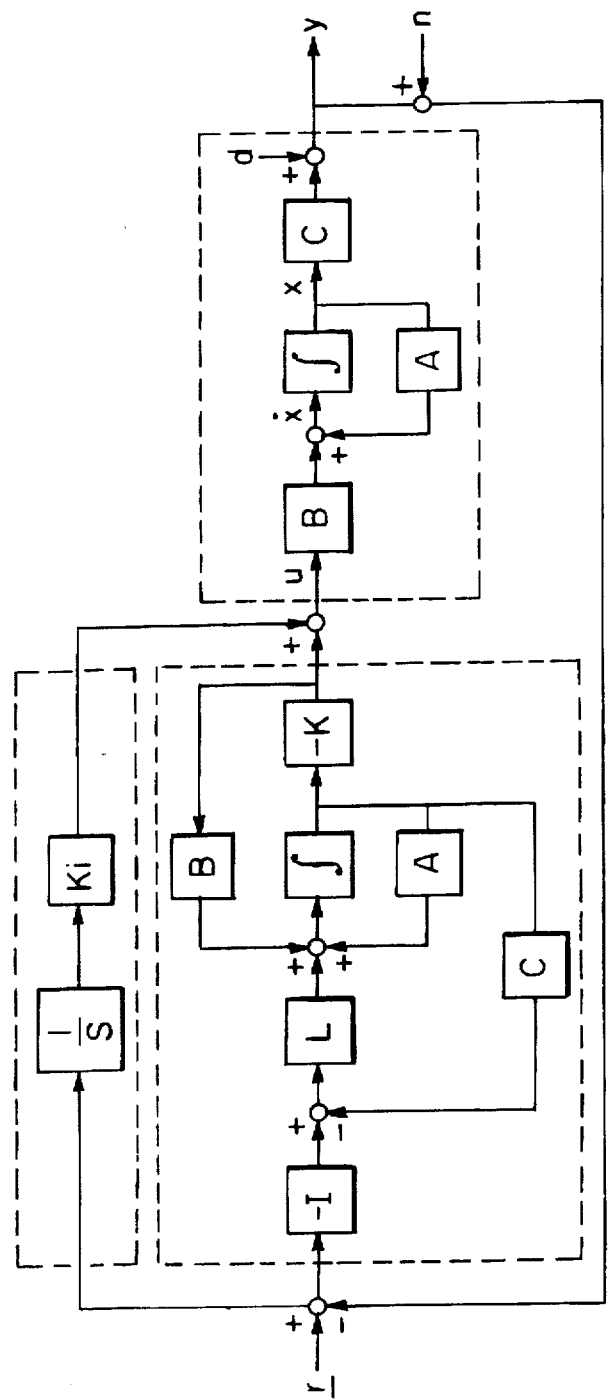
FIG. 12 is a schematic block diagram of a LQG multivariable controller in accordance with the present invention using integrators.
Figure 13B:
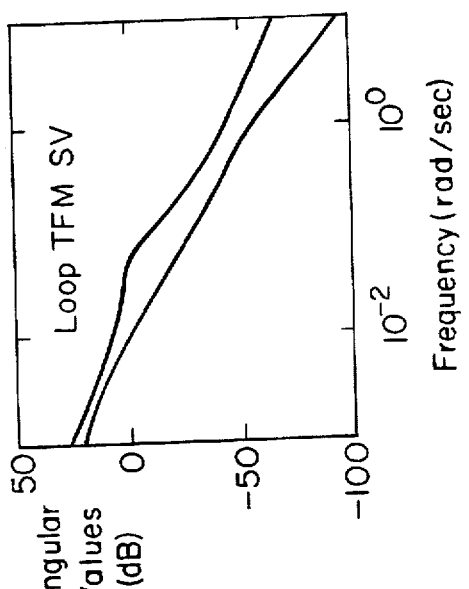
FIGS. 13A–13D depict the singular values of the dynamic model transfer function in accordance with the present invention.
Figure 13D:
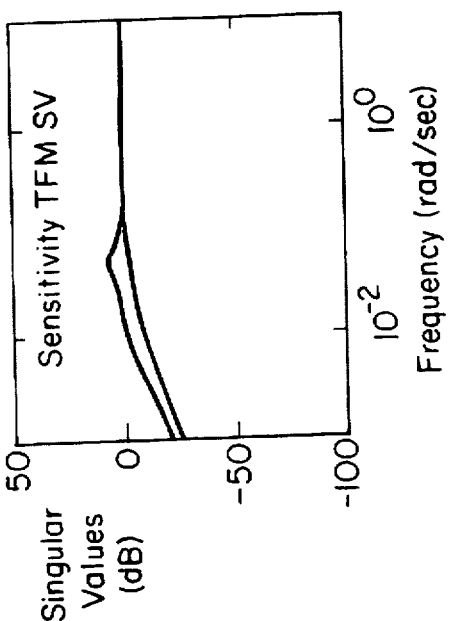
Figure 13A:
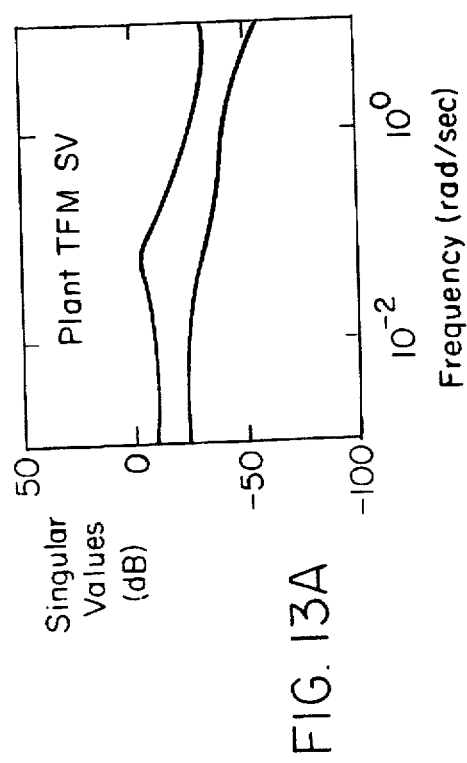
Figure 13C:
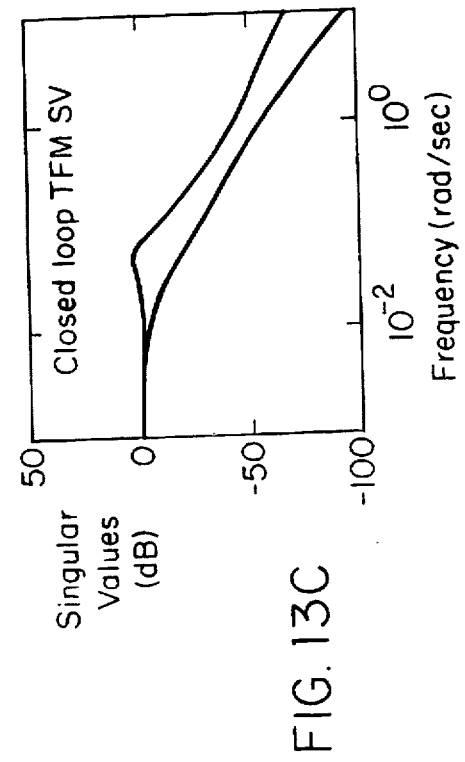
Figure 14B:
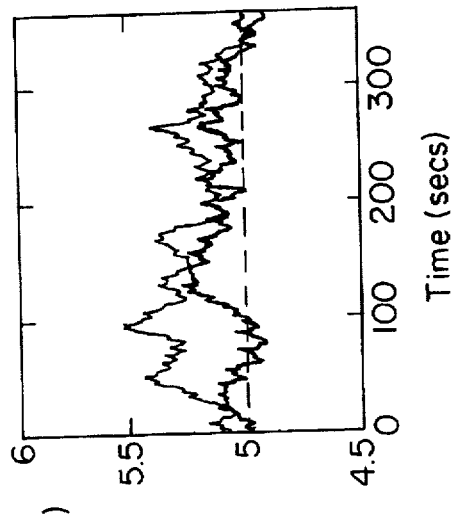
FIGS. 14A–14D show the command following capability of the MIMO control of the invention and SISO control.
Figure 14D:
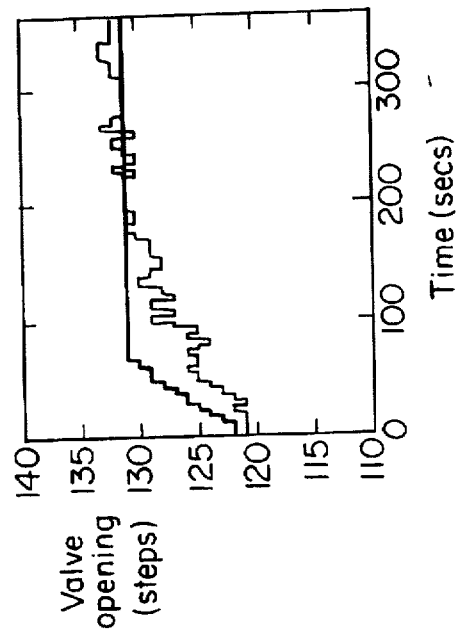
Figure 14A:
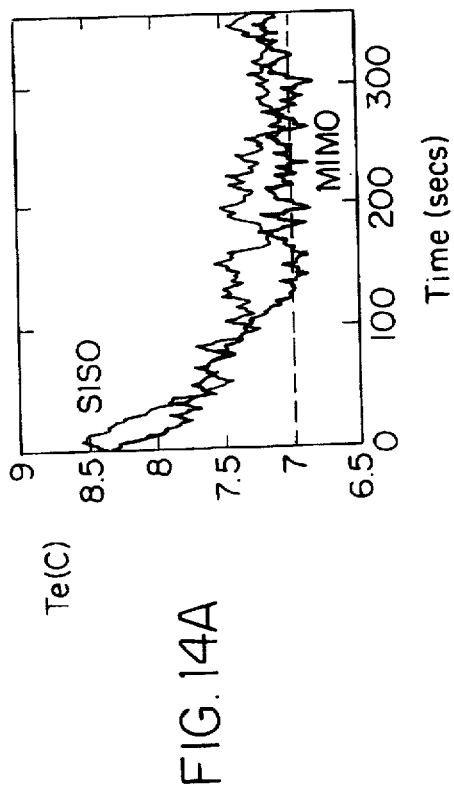
Figure 14C:
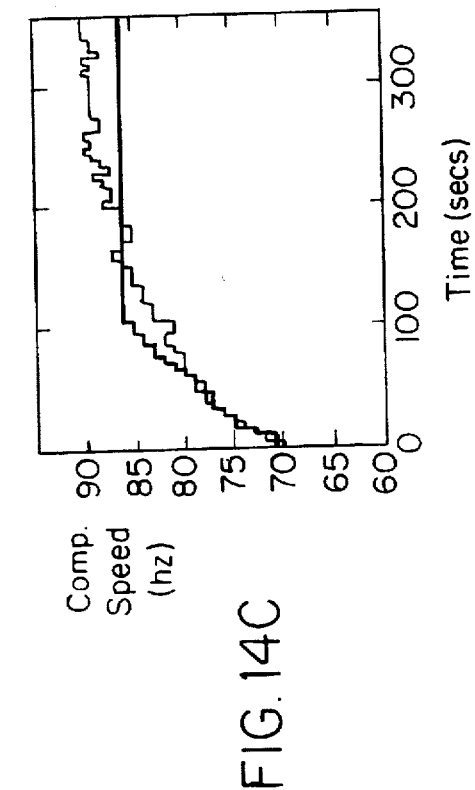
Figure 15A:
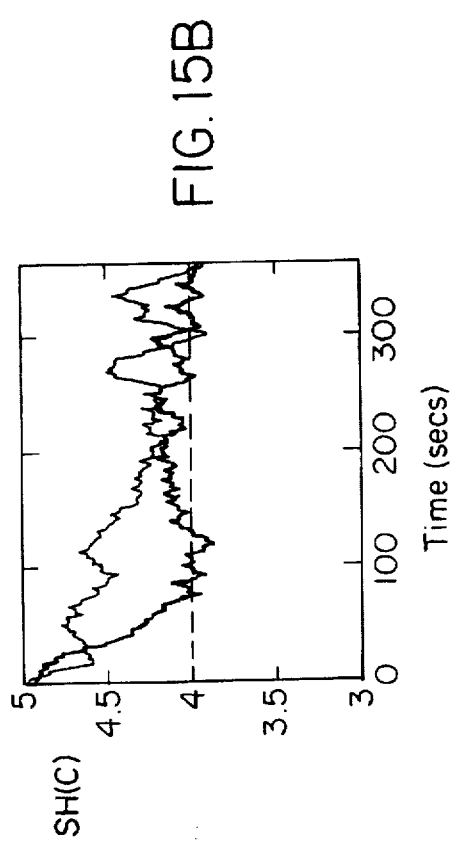
FIGS. 15A–15D show the comparison between SISO control and MIMO control of the invention when the desired superheat value is changed.
Figure 15B:
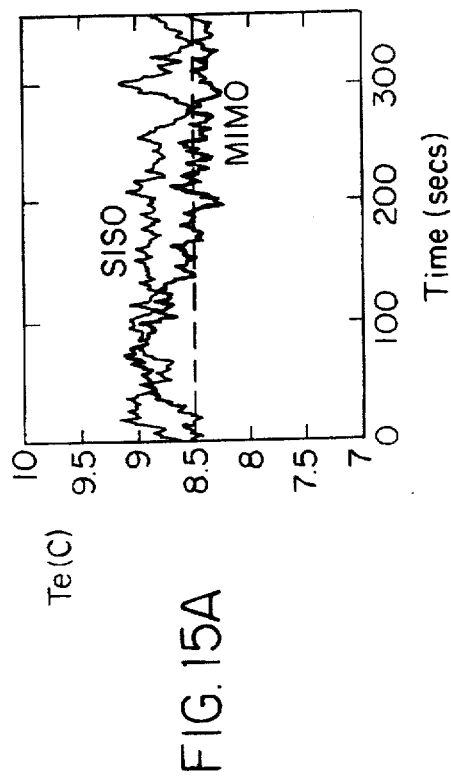
Figure 15C:
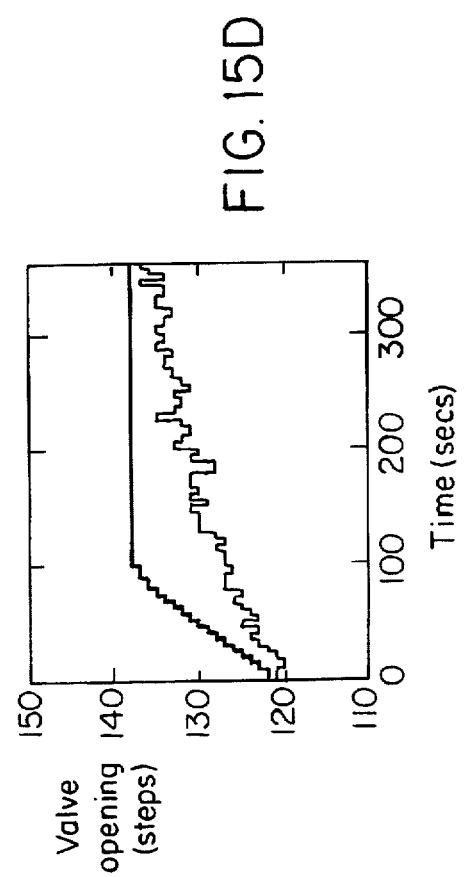
Figure 15D:
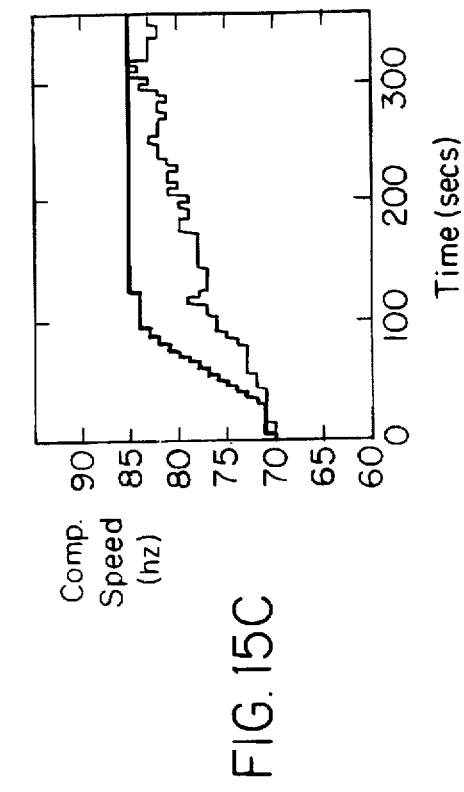
Figure 18A:
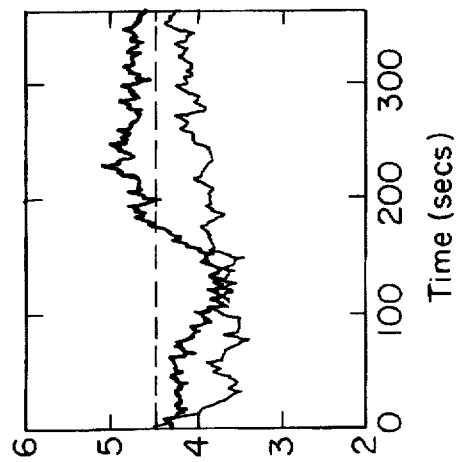
FIGS. 18A–18D depict the system response using gain scheduling upon a change in desired evaporating temperature.
Figure 18B:
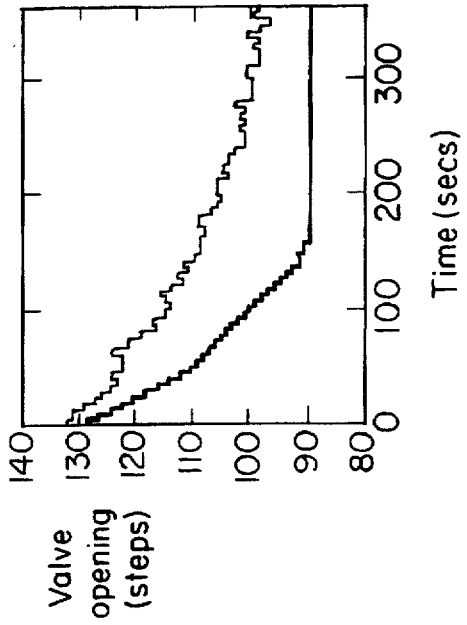
Figure 18C:
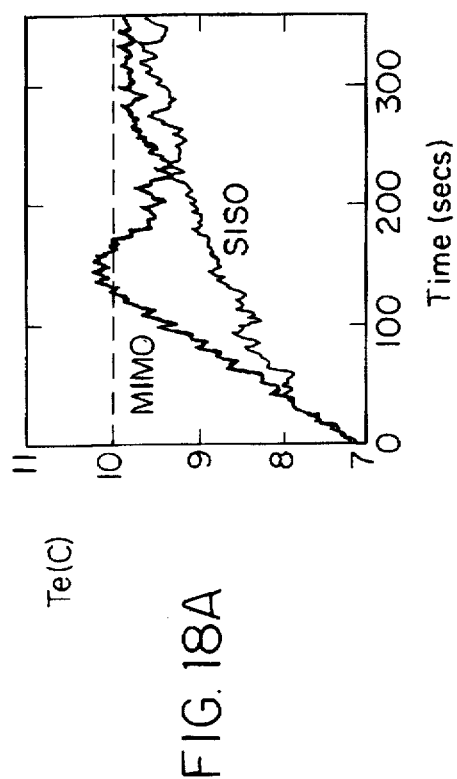
Figure 18D:
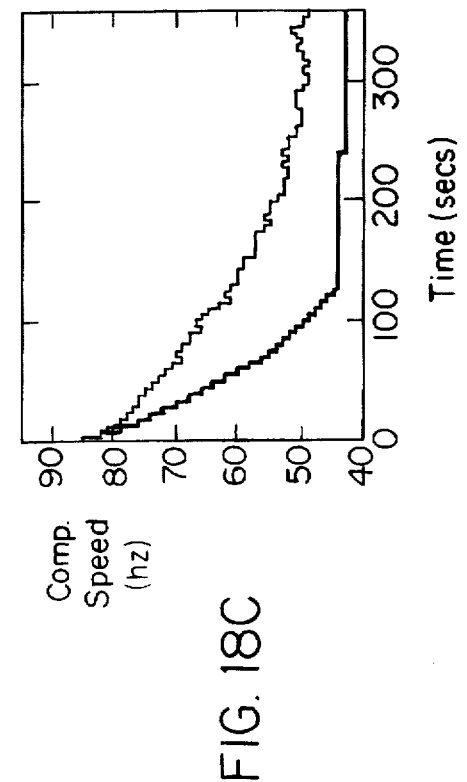

The structure of a LQG multivariable controller with integrators is shown in FIG. 12. It is an observer-based compensator which uses a Kalman filter to optimally estimate unmeasured state variables based on measurements and then uses the optimal full state feedback to generate the control law. The optimal gain matrix K and Kalman filter matrix L are determined based on the system matrix A, B, C, D of the dynamic model and weighting matrices Q and R for linear quadratic estimator.

The dynamic model of a vapor compressor cycle around an operating point is expressed in a state space form as follows:

$$\dot{x}=Ax+Bu \quad (34)$$

$$y=Cx+Du \quad (35)$$

where x are the state variables, u are control inputs, y are system outputs, and D=0.

The optimal feedback gain matrix K is calculated such that the feedback law u=−Kx minimizes the cost function:

$$J=\int(y'Qy+uRu)dt \quad (36)$$

subject to the constraint equation:

$$\dot{x}=Ax+Bu, \ y=Cx+Du$$

To obtain Kalman filter gain matrix L, linear quadratic estimator design is considered. For the system:

$$\dot{x}=Ax+Bu+Bw \quad (37)$$

$$y=Cx+Du+v \quad (38)$$

with process moise and measurement moise covariances:

$$E\{w\}=E\{v\}=0, \ E\{ww'\}=Q, \ E\{vv'\}=R, \ E\{wv'\}=0$$

The gain matrix L is obtained such that the stationary Kalman filter $$\dot{\hat{x}}=A\hat{x}+Bu+L(y-C\hat{x}-Du) \quad (39)$$

produces a linear quadratic Gaussian optimal estimate of state variables x based on the measurement output y and the state equations.

After gain matrix K and L are obtained, the transfer function of the observer-based compensator LQG can be expressed as $$C(s)=K(sI-A+BK+LC)^{-1}L.$$

Generally, a LQG control will have steady state error if the plant itself has no integrator. Therefore, for vapor compressor cycles which have no integrator in the dynamics, we need to include the integrator in LQG with integrator. To design a LQG with integrator based on the dynamic model, we at first need to include the integrators in the model, and then augment the states to include integrator variables. All outputs, integrator variables and control inputs are included in the cost function to be optimized.

Integration of y give rise to the integrator variables z.

$$\dot{z}=Iy \quad (40)$$

The augmented state is $$x_a=\begin{bmatrix} x \\ z \end{bmatrix}$$

Therefore the augmented state equations are $$\dot{x}_a=\begin{bmatrix} A & 0 \\ C & 0 \end{bmatrix}x_a+\begin{bmatrix} B \\ 0 \end{bmatrix}u$$

$$y_a=\begin{bmatrix} C & 0 \\ I & 0 \end{bmatrix}x_a$$

The optimal feedback gain matrix for the augmented system is obtained such that the feedback law $u=-K_a x_a u= -K_a x_a$ minimizes the cost function:

$$J=\int(y'_a Q y_a+uRu)dt \quad (41)$$

subject to the constraint of the augmented system state equations.

After the optimal feedback gain matrix $K_a$ is obtained, the control law can be expressed in the summation of two terms $$u=-K_a x_a=-[K \ K_I]\begin{bmatrix} x \\ z \end{bmatrix}=-Kx-K_I z \quad (42)$$

MIMO control for a vapor compression cycle can be designed based on the above procedures.

3.3.2. Digital implementation and Experimental Results

The multivariable control has been digitally implemental for a tested machine using a processor and memory and other associated circuitry as required. Five second sampling time was selected based on the main time constant of the system. The control inputs (compressor speed and expansion valve) are therefore generated based on the multivariable control law and the feedback signals of superheat SH and evaporating temperature Te.

In the design of the LQG with integrator, the bandwidth frequency is selected to be 0.1 rad/sec. The dominant frequency of the vapor compression cycle around the given operating point is about 0.05 rad/sec. FIGS. 13A–13D show the singular valve of the dynamic model transfer function, the loop transfer function (with controller), the closed loop transfer function and the sensitivity transfer function, respectively. The design has about 0.1 rad/sec closed loop bandwidth, and can tolerate about $\omega/0.1$ model error and have guaranteed performance error of less than $\omega/0.04$ for frequency less than 0.01 rad/sec.

To compare the command following capability of the MIMO control and the SISO control, the SISO control gains are best tuned. FIGS. 14A–14D show the results when the desired evaporating temperature $T_e$ is changed from 8.5° C. to 7° C. while the superheat value SH remains at 5° C. FIGS. 15A–15D show the comparisons when the desired superheat value is changed from 5° C. to 4° C. It can be seen that the MIMO control has much better performance than the SISO control in command following. For the SISO control, it takes about 4 to 6 minutes to reach steady state, however the MIMO control can reach steady state in 2 to 3 minutes. By utilizing the dynamic model and the coordination of two control inputs, the transient processes controlled by the MIMO system are much faster.

The disturbance rejection capability was tested both for the MIMO control and the SISO control. In the disturbance rejection tests, the desired superheat and evaporating temperature need to remain the same after the indoor fan speed is changed from 1000 rpm to 1200 rpm. FIGS. 16A–16D show the comparison results. It can be observed that the MIMO control has much better disturbance rejection capability that the SISO control as predicted in the previous section.

It is important to investigate the effects of high control gains and model errors on MIMO control stability and performance. Since there must exist a certain level of uncertainty in the dynamic model used for control design, too high control gains will enlarge the effect of model errors and actuators dynamics on the control stability. It turns out that the closed loop maximum singular values could go beyond the robustness bound. FIGS. 17A–17D show that if extremely high gains were used in MIMO control design, it caused instability of the closed loop system. Therefore, we need to select appropriate control gains for MIMO control. The effects of model errors on the MIMO control stability are also tested. It turned out that the closed loop system is still robustly stable even if the evaporating heat transfer coefficient or the mean void fraction has 50% change.

3.3.3. Control of Vapor Compression Cycle over a Wide Range Using Gain Scheduling Scheme It is desirable to control vapor compression cycle over a wide range based on MIMO controls. Since system nonlinearities become evident over a wide range of operating conditions, it is important to adapt the control law to different operating ranges using a gain scheduling technique. The use of gain scheduling 121 in the system of the invention is shown in the schematic functional block diagram of FIG. 1. The output of the set-point computation 110 is forwarded to the gain scheduling module 121 via line 123. A processor of the module 121 computes a new gain or gains as required to maintain the system operating point as desired. FIGS. 18A–18D show the control results over a wide range. The control goal in FIGS. 18A–18D is that the desired evaporating temperature needs to be changed from 7° C. to 10° C. while the superheat is kept at 4.5° C. From FIGS. 18A–18D, one can see that the compressor speed is changed about 40 Hz which is almost 50% operating range. We used two MIMO control laws for two operating points and successfully controlled the desired evaporating temperature and superheat. It can be seen that the MIMO control is much faster than the SISO control. In this situation, since the transient process controlled by the MIMO system is much quicker than that of the SISO control, the COP is significantly different as shown in FIGS. 19A–19B. The desired capacity can be reached much faster by use of MIMO Control.

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. A method of controlling a vapor compression cycle in a vapor compression system comprising:
   (a) generating a set of parameters which define an operating condition for the vapor compression system;
   (b) operating the vapor compression system in accordance with the set of parameters;
   (c) while the system operates, receiving a real-time measurement of at least one of the parameters;
   (d) using the real-time measurement, calculating the real-time coefficient of performance of the vapor compression system;
   (e) adjusting the at least one parameter; and
   (f) repetitively performing steps (c) through (e) as required to maximize the real-time coefficient of performance.

2. The method of claim 1 wherein the at least one parameter is temperature of a refrigerant of the vapor compression system.

3. The method of claim 1 further comprising providing a multivariable controller for adjusting the at least one parameter.

4. The method of claim 3 further comprising adjusting a gain of the multivariable controller to adjust the at least one parameter.

5. The method of claim 1 further comprising receiving an environmental input used in generating the set of parameters.

6. The method of claim 1 wherein the step of repetitively performing steps (c) through (e) comprises an iterative search for a maximum real-time coefficient of performance.

7. The method of claim 1 wherein the step of adjusting the at least one parameter comprises adjusting at least one control input to control a component of the system.

8. The method of claim 5 wherein the environmental input comprises a measurement of indoor temperature.

9. The method of claim 5 wherein the environmental input comprises a measurement of outdoor temperature.

10. The method of claim 5 wherein the environmental input comprises a measurement of system thermal load.

11. The method of claim 7 wherein the at least one control input controls a valve opening.

12. The method of claim 7 wherein the at least one control input controls a condenser fan speed.

13. The method of claim 7 wherein the at least one control input controls a compressor fan speed.

14. The method of claim 7 wherein the at least one control input controls a speed of a compressor.

15. The method of claim 14 wherein the iterative search comprises a constrained gradient descent search.

16. A vapor compression system comprising:
   means for generating a set of parameters which define an operating condition for the vapor compression system;
   means for generating a real-time measurement of at least one of the parameters as the vapor compression system operates; and
   means for repetitively calculating the real-time coefficient of performance of the vapor compression system using the real-time measurement of the at least one parameter and adjusting the at least one parameter to maximize the real-time coefficient of performance.

17. The vapor compression system of claim 16 wherein the at least one parameter is temperature of a refrigerant in the vapor compression system.

18. The vapor compression system of claim 16 further comprising a multivariable controller for adjusting at least one parameter.

19. The vapor compression system of claim 18 further comprising a gain scheduler for altering a gain in the multivariable controller to adjust the at least one parameter.

20. The vapor compression system of claim 16 further comprising means for adjusting at least one control input to control a component of the vapor compression system to adjust the at least one parameter.

21. The vapor compression system of claim 20 wherein the at least one control input controls a speed of a compressor.

22. The vapor compression system of claim 20 wherein the at least one control input controls a valve opening.

23. The vapor compression system of claim 20 wherein the at least one control input controls a condenser fan speed.

24. The vapor compression system of claim 20 wherein the at least one control input controls a compressor fan speed.

25. The vapor compression system of claim 16 further comprising means for providing an environmental input defining a condition of the environment in which the vapor compression system operates, the environmental input being used to generate the set of parameters.

26. The vapor compression system of claim 25 wherein the environmental input comprises a measurement of indoor temperature.

27. The vapor compression system of claim 25 wherein the environmental input comprises a measurement of outdoor temperature.

28. The vapor compression system of claim 25 wherein the environmental input comprises a measurement of system thermal load.

29. The vapor compression system of claim 16 wherein the means for repetitively calculating the real-time coefficient of performance of the vapor compression system performs an iterative search to maximize the real-time coefficient of performance.

30. The vapor compression system of claim 29 wherein the iterative search comprises a constrained gradient descent search.

* * * * *